S. CUMMINGS.
Treating Hop-Vines.
No. 49,238.
Patented Aug. 8, 1865.
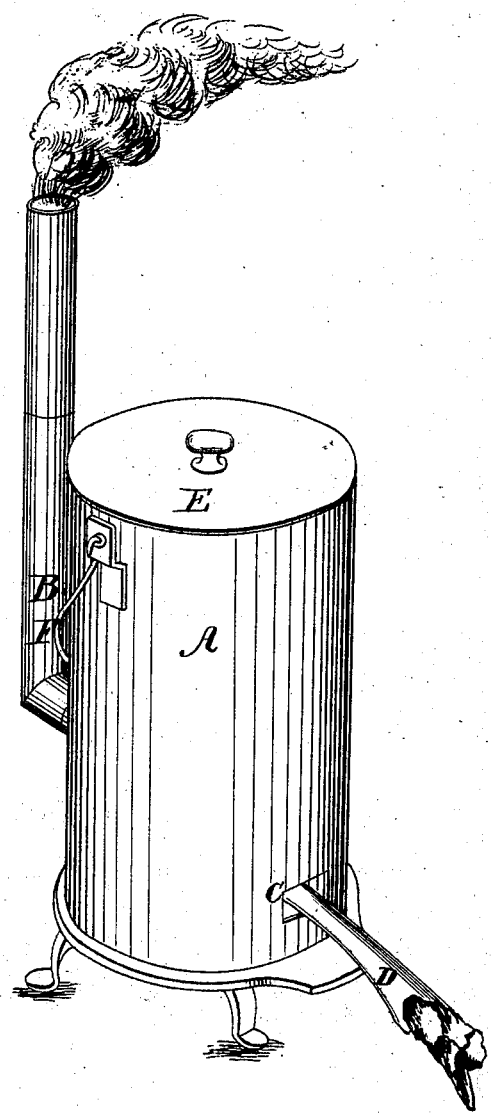
Witnesses:
Inventor:

UNITED STATES PATENT OFFICE.

SCHUYLER CUMMINGS, OF MIDDLEFIELD, NEW YORK.

IMPROVEMENT IN PROCESSES OF PRESERVING THE ROOTS OF HOP-VINES BY CHARRING THE STEMS.

Specification forming part of Letters Patent No. 49,238, dated August 8, 1865.

*To all whom it may concern:*

Be it known that I, SCHUYLER CUMMINGS, of Middlefield, in the county of Otsego and State of New York, have invented a new and useful Improvement in the Mode of Treating Vines; and I do hereby declare that the following is a full, clear, and exact description thereof, which will enable others skilled in the art to make and use the same, reference being had to the accompanying drawing, forming part of this specification.

The drawing, consisting of only one figure, shows a furnace which may be used in carrying out my invention, and it also shows the manner of using it in treating a hop-vine.

The object of this process is to close the pores of that part of the vine which is connected with the root, and thereby prevent it from bleeding, and so preserve the root from exhaustion and premature decay.

Great loss has been sustained by those in the hop-culture by cutting the vine to harvest the crop too early in order to save it, that the root would become exhausted and die from bleeding. This necessity for early harvesting arises from various causes. At the present time labor is so scarce throughout the country that, if the hop is in a healthy condition, growers are obliged, in order to save their crop, to commence harvesting so soon that the bleeding exhausts and destroys the roots of those that are cut early. It is a fact well known to all hop-growers that if the vine is cut while it is yet green, before it becomes measurably dried, so as to close the pores, the vine will bleed so profusely as to exhaust the root and produce premature decay. It is also a fact well known that for many years past the hop has been attacked annually, in this country as well as in Europe, by vermin about the time it is fully developed and before the vine has become hardened, so that growers must entirely lose their crop by letting the hops remain upon the pole and be endangered by vermin in order that the vine may become hard; or they may save their crops by cutting the vines and harvesting the hop early, and thereby ruin their yard and destroying the roots from excessive bleeding.

After great labor and expense in experimenting for years past I have invented the process hereinafter described of charring the stump of the vine connected with the root.

I carry out my invention by means of a portable furnace, which enables the grower to entirely obviate all the difficulties hitherto experienced when the crop has been harvested early, preventing the loss of the sap, and also enables the grower to secure his crop at any time and under any circumstances, and at the same time to save his roots in his yard in a perfectly healthy and vigorous condition for another year's growth.

The device which I use in carrying out my invention consists of a furnace, which may be of any desirable and convenient form and size. The furnace shown in the drawing has been adopted by me after much study and experiment. It may be two feet high and about one foot and a half in diameter, and may have legs about six inches high. It is provided with a cover, E, and a bail, F, furnishes the means for carrying it from hill to hill. The products of combustion and hot gases from the fire within pass away through a pipe, B, which ascends from the back part of the furnace. On its front, about two inches from its bottom, I make an opening about two and a half or three inches long by one and a half or two inches wide. This opening serves both for the draft and for enabling one to char the vines which are under treatment.

The manner of conducting my process is as follows: A fire is kindled in the furnace with charcoal, bark, or other combustible material, access for the supply of fuel being had through the top when the cover is removed. The cover is then put on, and while the fuel is incandescent the furnace is carried to a hill of hops whose vine has been recently cut, and the stump, which is usually left of a length about two feet from the ground, is inserted through the opening C and exposed to the fire until it is completely charred for a length of about six inches from the end where the cut is made. The action of the fire and heat on the vine effectually closes the pores of the plant and prevents the sap from running away at the place of the wound. The drawing represents an end or stump, D, of a vine inserted into the opening of the furnace.

I do not claim searing the ends of hop vines, as that has been long known, and is ineffectual in preventing the bleeding of the vines; but, Having thus set forth my invention, I claim—

The process and mode of treating hop-vines, substantially as above described, for the purpose of preventing them from bleeding after being cut in harvesting the crop.

The above specification of my invention signed by me this 9th day of June, 1865.

SCHUYLER CUMMINGS.

Witnesses:
HARRISON NORTH,
LEROY E. BOWE.